United States Patent [19]

Schmitz

[11] 4,387,054

[45] Jun. 7, 1983

[54] PROCESS FOR THE PREPARATION OF QUINIZARIN

[75] Inventor: Reinold Schmitz, Odenthal, Fed. Rep. of Germany

[73] Assignee: Bayer Aktiengesellschaft, Leverkusen, Fed. Rep. of Germany

[21] Appl. No.: 43,805

[22] Filed: May 30, 1979

[30] Foreign Application Priority Data

Jul. 12, 1978 [DE] Fed. Rep. of Germany ....... 2830554

[51] Int. Cl.$^3$ .......................... C07C 49/68; C09B 1/02
[52] U.S. Cl. .................................................... 260/383
[58] Field of Search .......................................... 260/383

[56] References Cited

U.S. PATENT DOCUMENTS

| | | | |
|---|---|---|---|
| 1,087,412 | 2/1914 | Unger et al. | 260/383 |
| 1,790,510 | 1/1931 | Orelup | 260/383 |
| 2,445,538 | 7/1948 | Sievenpiper | 260/383 |
| 2,752,364 | 6/1956 | Shrader | 260/383 |

FOREIGN PATENT DOCUMENTS 255031  1/1912  Fed. Rep. of Germany ...... 260/383

*Primary Examiner*—Helen M. S. Sneed
*Attorney, Agent, or Firm*—Sprung, Horn, Kramer & Woods

[57] ABSTRACT

A process, which does not pollute the environment, for the preparation of quinizarin consists in reacting a mixture of phthalic anhydride p-chlorophenol, sulphuric acid and boric acid or boric anhydride at elevated temperatures in such a way that, in the reaction mixture, there is sulphuric acid preferably containing 10–20% of free $SO_3$ and the weight ratio of p-chlorophenol to the total amount of $H_2SO_4 + SO_3$ is 1:1.5 to 4.0. Yields and purity of the product are outstanding, despite the concentrated procedure.

9 Claims, No Drawings

PROCESS FOR THE PREPARATION OF QUINIZARIN

The invention relates to an improved process for the preparation of quinizarin, which is an important dyestuff intermediate, by reaction, at temperatures of 150°–220° C., of phthalic anhydride with p-chlorophenol in sulphuric acid containing boric acid.

Although this process has been known for decades (compare German Patent Specification No. 255,031) and is used in industry, it has never been able to give complete satisfaction because it is affected by a number of serious disadvantages.

In this context, the high sulphuric acid consumption can be mentioned in particular (compare U.S. Pat. No. 2,445,538, column 1). There has therefore been no lack of attempts to reduce the amount of sulphuric acid. However, yield and degree of purity of the reaction product have thereby always been impaired (see ibid., column 2). According to U.S. Pat. No. 2,445,538, the amount of sulphuric acid can be considerably reduced, without losses in yield, by adding the p-chlorophenol slowly, at the reaction temperature, to the mixture of phthalic anhydride boric acid and 95% strength, preferably 98- to 100% strength, sulphuric acid, whilst maintaining particular reaction conditions.

However, this process has the disadvantage that it is comparatively expensive and requires a relatively complicated apparatus and is difficult to control when it is carried out in industry.

Various other methods (compare DE-OS (German Published Specifications Nos.) 1,543,352 and 2,014,566 and U.S. Pat. No. 2,752,364) for improving this industrially important quinizarin synthesis have also been unable to solve its diverse problems completely, because they require either the addition of very toxic chemicals (fluorine compounds or trichlorobenzene) or additional operating stages.

It has now been found that high-grade quinizarin is obtained in good yields, in a simple manner and without the addition of expensive and possibly toxic substances, by ensuring that, in the reaction mixture, there is sulphuric acid containing at least 10% of free $SO_3$ and the weight ratio of p-chlorophenol to the total amount of $H_2SO_4 + SO_3$ is 1:1.5–4.0.

The calculation of the free $SO_3$ content is based on the assumption, in agreement with the hypothesis encountered in U.S. Pat. No. 2,445,538 (column 3, line 55 et seq.), that $H_2SO_4$, $B_2O_3$ and $SO_3$ are present in the reaction mixture, that is to say that, when using free boric acid, the $SO_3$ consumed in accordance with $2H_3BO_3 + 3SO_3 \rightarrow 3H_2SO_4 + B_2O_3$ is calculated at $H_2SO_4$.

The smooth course of the reaction of the process according to the invention must be regarded as decidedly surprising because it was known, from U.S. Pat. No. 2,445,538 (column 4, lines 15–20), that the use of more than 10% strength oleum promotes the formation of byproducts which has an adverse influence on the yield and purity of the quinizarin.

Moreover, the process according to the invention is carried out under customary conditions, that is to say in the temperature range mentioned in the introduction and with a ratio of amounts p-chlorophenol/phthalic anhydride of 1:2–3.

The $SO_3$ content in the oleum employed is 10–65% by weight.

However, the reaction is preferably carried out with 10 to 20% strength oleum at 190°–210° C., in which case it is virtually complete after 15–20 hours.

According to a particularly economic variant of the new process, p-chlorophenyl and phthalic anhydride are employed in a weight ratio of 1:1.2–1.5 (preferably 1.3).

The fact that this drastic reduction in the amount of phthalic anhydride does not impair the grade and yield of the reaction product must be regarded as surprising because U.S. Pat. No. 2,445,538 (column 6, lines 53–57) teaches that the use of substantially less than 1.8 parts by weight of phthalic anhydride, relative to 1 part of phenol derivative, leads to reduced yields.

However, it is appropriate during the reaction to ensure that the phthalic anhydride does not sublime out of the reaction vessel during the reaction and possibly block the lines which carry the reaction gases away, by heating the walls and cover of the reaction vessel, and optionally the exhaust lines, to 135°–155° C. According to U.S. Pat. No. 2,752,364, the danger of blockage is avoided by adding trichlorobenzene, this being an elegant precaution for the laboratory because, by refluxing gently, the trichlorobenzene rinses all the sublimed phthalic anhydride back into the reaction. However, on an industrial scale, the use of this chlorohydrocarbon is prohibited because of its toxicity. On the other hand, less toxic solvents have not met with the desired success. (compare U.S. Pat. No. 2,752,364, Example 2).

The reaction mixture can be worked up in various ways. For example, the borosulphuric acid ester of quinizarin, described in German Patent Specification No. 255,031, can be isolated first in accordance with U.S. Pat. No. 2,003,859. This process has the advantage that most of the sulphuric acid is obtained in a highly concentrated form and with a relatively low boric acid content. It is therefore better if this waste sulphuric acid is worked up again, for example by splitting to give $SO_2$ which can be re-used in the manufacture of sulphuric acid. The total batch or the isolated boric acid ester can be worked up, particularly in the laboratory, by dilution with water, neturalisation, for example with ammonia, and heating the neutralised mixture to 95° to 100° C. for one hour. However, it is also possible (compare Ind. and Eng. Chem. 46, page 1,153) to heat the batch, after dilution with water to give a sulphuric acid concentration of about 30%, or the isolated borosulphuric acid ester in aqueous suspension, to 130° C. in a closed kettle for 3 to 5 hours; after filtering off, washing and drying, virtually the same result is obtained as in the case of working up by neutralisation. When working up under both acid and neutral conditions, the addition of non-ionic surface-active materials of the polyglycol type (for example polyglycol ethers of oleyl alcohol of polyglycol esters of abietic acid, in concentrations of 0.5–5%, relative to the volume of liquid, has a favourable influence on the content, in the quinizarin obtained, of substances which are insoluble in chlorobenzene. This proportion of the quinizarin which is insoluble in chlorobenzene is essential for the usefulness of the quinizarin in dyestuff syntheses. A higher proportion would necessitate a purification, possibly by sublimation or distillation. The quinizarin prepared in accordance with the new process contains 0.5–2% of substances which are insoluble in chlorobenzene and can be used for virtually all purposes without further purification.

The new process is illustrated in greater detail by means of the following examples.

EXAMPLE 1

252 g of 4-chlorophenol are introduced, at 120° C., into a mixture of 410 ml of 20% strength oleum, 320 g of phthalic anhydride and 114 g of boric anhydride ($B_2O_3$). The reaction mixture is heated to 200° C. for 16 hours under a nitrogen atmosphere. The walls of the reaction vessel which are not wetted by the reaction mixture are appropriately heated to 150°. Thereafter, the reaction mixture is cooled to 100° C. and added to 5 liters of water. After neutralisation with 25% strength $NH_3$ solution and after the addition of 25 g of commercial pulyetherbased emulsifying agent, the mixture is heated for 1 hour to 95°–100° C. The product is filtered off and washed with hot water at 60° to 80° C. until the washings are neutral. After drying, this yields 401.3 g (79.7% of theory, relative to 4-chlorophenol) of quinizarin which is 93.5% pure and contains 1.1% of substances which are insoluble in chlorobenzene. If the mixture is heated for 20 hours to 195° C. instead of for 16 hours to 200° C., 398.6 g (79.8% of theory) of 94.3% pure quinizarin are obtained which only contains 0.8% of substances which are insoluble in chlorobenzene.

EXAMPLE 2

340 ml of 65% strength oleum are run into a mixture of 210 g of 4-chlorophenyl and 170 g of boric acid in the course of half an hour and at a temperature rising to 160° C. and with the exclusion of air. Sulphuric acid containing 11% of free $SO_3$ is thus produced in the reaction mixture. 290 g of phthalic anhydride are then added and the batch is heated for 16 hours to 200° C. The walls of the reaction vessel which are not wetted by the reaction mixture are appropriately heated to 150° C. If working up is carried out as in Example 1, 337 g (80.2% of theory) of 93.4% pure quinizarin are obtained. (Proportion of substances which are insoluble in chlorobenzene: 0.9%). If only 150 g of boric acid are employed in this example instead of 170 g of boric acid, 338.5 g (80.2% of theory) of 93.0% pure quinizarin are obtained (proportion of substances which are insoluble in chlorobenzene: 1%).

EXAMPLE 3

A mixture of 380 ml of 20% strength oleum, 320 g of phthalic anhydride, 114 g of boric anhydride and 252 g of 4-chlorophenol is heated to 195° under a nitrogen atmosphere for 16 hours. After cooling to 100°, the reaction mixture is diluted with 1,800 ml of water, 20 g of commercial polyether-based emulsifying agent are added and the mixture is heated to 130° in a pressure vessel for 5 hours. After cooling to 80°, the product is filtered off and washed with warm water at 80° until the washings are neutral, and dried. This yields 390.6 g of quinizarin which is 93.9% pure (77.9% of theory) and contains 1% of constitutents which are insoluble in chlorobenzene.

I claim:

1. In a process for the preparation of quinizarin by reaction of a mixture of phthalic anhydride, p-chlorophenol, sulphuric acid and boric acid or boric anhydride at an elevated temperature, the improvement wherein the reaction mixture there is sulphuric acid containing at least 10 percent by weight of free $SO_3$ and the weight ratio of p-chlorophenol to the total amount of $H_2SO_4+SO_3$ is 1:1.5 to 4.0.

2. Process according to claim 1, wherein the content of free $SO_3$ is 10–65%.

3. Process according to claim 1, wherein in order to produce the required $SO_3$ content, a more highly concentrated oleum is treated with free boric acid.

4. Process according to claim 1, wherein the reaction is carried out at between 190° and 210° C.

5. Process according to claim 1, wherein the phthalic anhydride is employed in a 1.3- to 1.5-fold, amount by weight, relative to the amount of 4-chlorophenol.

6. A process according to claim 1, wherein the process is carried out such that at least a portion of the walls and at least a portion of the cover are not wetted by the reaction mixture and that portion of the walls and the cover of the reaction vessel which are not wetted by the reaction mixture are heated to 135° to 155° C. during the reaction.

7. A process according to claim 1, wherein the reaction mixture is worked up under aqueous conditions and a non-ionic surface-active agent is added in a concentration of 0.5 to 5%.

8. Process according to claim 7, wherein the non-ionic surface-active agent is a polyglycol ether or polyglycol ester.

9. Process according to claim 8, wherein the non-ionic surface-active agent is a polyglycol ester of abietic acid or a polyglycol ether of oleyl alcohol.

* * * * *